(12) United States Patent
Davis

(10) Patent No.: US 7,232,197 B2
(45) Date of Patent: Jun. 19, 2007

(54) FIRE-SAFE ELECTRONIC DATA STORAGE PROTECTION DEVICE

(76) Inventor: William P. Davis, 215 E. Thorndale Ave., Roselle, IL (US) 60172

( * ) Notice: Subject to any disclaimer, the term of this patent is extended or adjusted under 35 U.S.C. 154(b) by 730 days.

(21) Appl. No.: 10/464,595

(22) Filed: Jun. 18, 2003

(65) Prior Publication Data

US 2004/0012316 A1 Jan. 22, 2004

Related U.S. Application Data

(63) Continuation of application No. 09/640,197, filed on Aug. 16, 2000, now abandoned.

(51) Int. Cl.
*A47B 96/00* (2006.01)
(52) U.S. Cl. .................................. 312/409
(58) Field of Classification Search ............. 312/409, 312/213, 223.1, 223.2, 223.6, 400; 109/65, 109/80, 82, 83, 84; 220/4.02, 560.01, 592.03
See application file for complete search history.

(56) References Cited

U.S. PATENT DOCUMENTS

| | | | | |
|---|---|---|---|---|
| 2,345,792 A | * | 4/1944 | Cann | 312/290 |
| 4,236,463 A | * | 12/1980 | Westcott | 109/33 |
| 5,295,447 A | * | 3/1994 | Robbins et al. | 109/65 |
| 5,390,797 A | * | 2/1995 | Smalley et al. | 206/542 |
| 5,397,237 A | * | 3/1995 | Dhont et al. | 434/262 |
| 5,623,597 A | * | 4/1997 | Kikinis | 713/200 |

FOREIGN PATENT DOCUMENTS

CA  900551  * 5/1972  ............. 312/409

* cited by examiner

*Primary Examiner*—James O. Hansen
(74) *Attorney, Agent, or Firm*—James P. Murphy

(57) ABSTRACT

A fire-safe electronic data storage protection device is provided which allows all-time data storage backup and protection. A preferred embodiment of the device includes a fire-proof enclosure having an openable and closeable door which can be opened after the device is exposed to a fire. The enclosure is of a sufficient size to store an electronic data storage device such as a Zip® drive or CD-ROM storage device or the like. Further, the walls of the enclosure are insulated to withstand fire and carry electronic connection and data relay cords, so that the electronic storage device inside may be in continuous connection with a main database and a power supply. The electrical and communication cords are configured within the insulation and walls of the enclosure to ensure no fire reaches the inside of the enclosure.

21 Claims, 1 Drawing Sheet

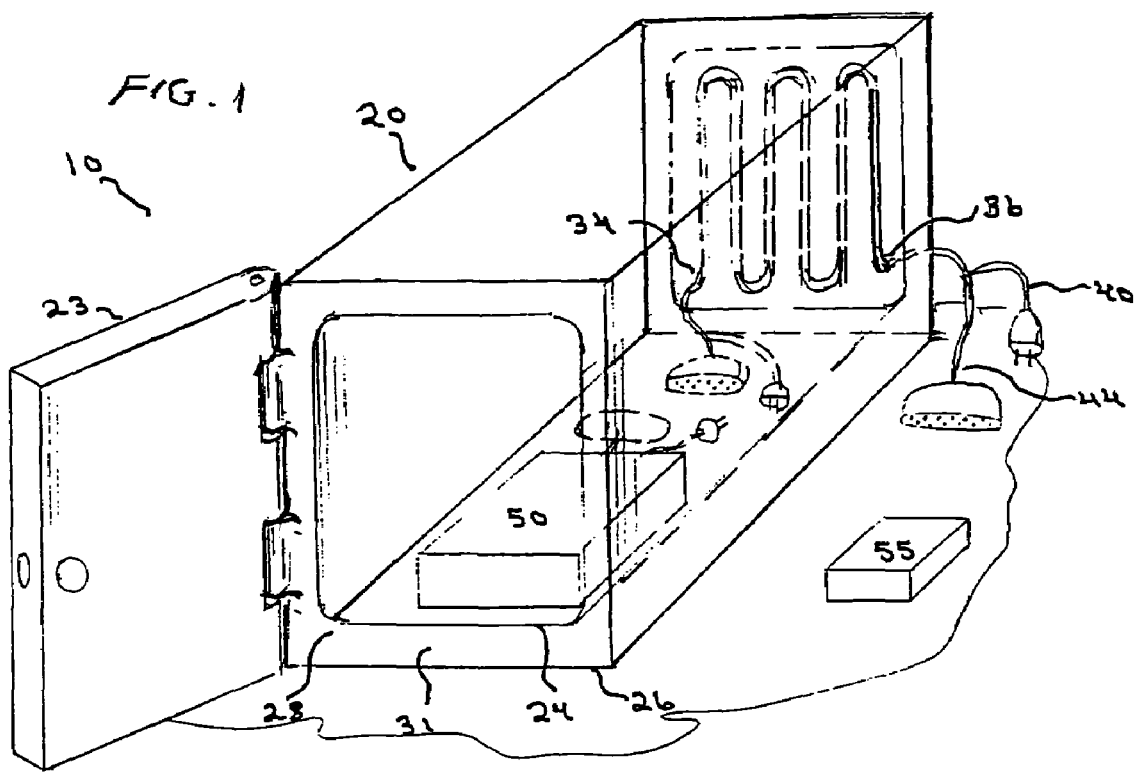
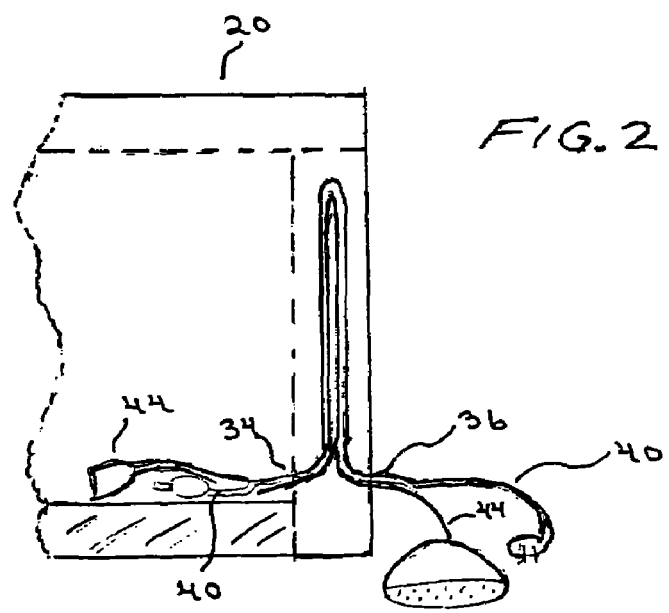

FIRE-SAFE ELECTRONIC DATA STORAGE PROTECTION DEVICE

RELATED APPLICATIONS

This application claims priority to, and is a continuation of Nonprovisional patent application Ser. No. 09/640,197, filed Aug. 16, 2000 now abandoned.

FEDERALLY SPONSORED RESEARCH OR DEVELOPMENT

Not Applicable

MICROFICHE/COPYRIGHT REFERENCE

Not Applicable

BACKGROUND OF THE INVENTION

Computers are used in homes and businesses to process and store data. Computer usage has become common in all aspects of business and personal life. Valuable data is often processed and stored on computers. Thus, periodic backups are maintained on separate data storage media to preserve backup copies of stored electronic data from a computer. Backups may help to ensure against loss of important data in case of a computer malfunction or other unforeseen contingency. However, computers and backup data storage devices generally are not adequately protected against extreme environmental hazards, such as fire. It is believed that computer users generally do not adequately protect computers and data storage against extreme environmental hazards, such as fire.

In a fire, any computer device exposed to the fire would surely be damaged or destroyed. As such, the most important part of the computer—the data—would be lost. While a computer or other piece of hardware and some software can be readily replaced, data which is lost or destroyed may be irretrievable.

U.S. Pat. No. 5,623,597 discloses a data storage device which uses a heat sink and heat transfer system to transfer heat from inside the data storage device to outside the device and to prevent outside heat from being transferred inside the data storage device. The device requires a heat transfer system. The device also requires a controller to activate and deactivate the heat transfer system.

U.S. Pat. No. 5,479,341 discloses a data security apparatus that protects data storage devices from adverse conditions. The apparatus has a control unit. The apparatus has sensors to detect adverse conditions. Upon detection, the control unit disconnects the data storage device and closes and locks the apparatus.

Current systems require elaborate controls and sensors to detect heat and react accordingly. Current systems may be more costly and more time consuming to manufacture. There is a need for a passive storage device capable of protecting electronically stored data during extreme environmental episodes on a continuous basis, and without complex controls, moving parts, etc. There is a need for a method of protecting electronically stored data during extreme environmental episodes while allowing for data transmission to the device.

Thus, a need exists for a device which protects electronically stored data during extreme environmental episodes, such as fire.

FIELD OF THE INVENTION

The present invention generally relates to secure storage of electronic data and, more particularly, relates to a device for continuously saving and protecting electronically stored data from fire and other environmental hazards.

SUMMARY OF THE INVENTION

According to a preferred embodiment of the present invention, a fire-proof enclosure is provided having at least one internal power supply link and at least one internal data link in constant communication with at least one central database to continuously store desired data and protect the stored data during fire or other environmental hazard. A preferred embodiment includes a non-thermally conducting resin or metal enclosure with a door and walls containing insulation; an electronic data storage device insertable and removable from the enclosure; a power cord within the enclosure and extending outside the enclosure and a data communication link within the enclosure and extending outside the enclosure. Within the metal walls is insulation of a suitable material and the power cord and the data link cord configured sufficiently to prevent fire or other environmental hazard from entering or affecting the contents of the enclosure.

BRIEF DESCRIPTION OF THE DRAWINGS

FIG. 1 illustrates a preferred embodiment of a device for continuously saving and protecting electronically stored data from fire and other environmental hazards.

FIG. 2 illustrates a preferred embodiment of baffling cords in a wall of a device for continuously saving and protecting electronically stored data from fire and other environmental hazards.

DESCRIPTION OF THE PREFERRED EMBODIMENT

FIG. 1 illustrates a preferred embodiment of a device 10 for continuously saving and protecting electronically stored data from fire and other environmental hazards. The device 10 comprises a system of components. The first component is fire-proof storage enclosure 20. Enclosure 20 is a six-sided box having an outer wall 26 inner wall 24 and a gap 28 between inner wall 24 and outer wall 26. One side of enclosure 20 is door 23. Door 23 is hinged to enclosure 20 for access to the inside. Gap 28 between inner wall 24 and outer wall 26 contains insulation material 31.

Walls 24, 26 may be any suitable material, such as steel or aluminum. A preferred embodiment may eliminate the thermally conductive material and use a non-thermally conducting material, such as resin. An example of an enclosure using resin material is described in U.S. Pat. No. 4,541,545. Another example of an enclosure using resin material is described in U.S. Pat. No. 5,377,514. An example of a preferred embodiment of an enclosure using a resin material may be a Sentry 1710 Fire-Safe® Media Chest made by Sentry Group.

Insulation 31 may be any suitable material such as a non-flammable, thermal insulating material with a substantial volume of chemically bonded water. An example of a non-flammable, thermal insulating material with a substantial volume of chemically bonded water is described in U.S. Pat. No. 4,048,926. A preferred material may be foamed concrete containing substantial water in excess of the chemically bonded water. The foamed concrete may be preferably reinforced with a woven wire element or strands of reinforcing material. The foamed concrete preferably contains an aggregate holding absorbed water in excess of the chemically bonded water. An example of a foamed concrete is described in U.S. Pat. No. 4,048,926. Another preferred material may be an insulation material such as fiberglass, foam, or polystyrene dry insulation.

Another component of the present invention is at least one power cord and at least one communication link within enclosure 20 extending outside of enclosure 20. At least two sets of portals 34, 36 exist in inner wall 24 and in outer wall 26. Power cord 40 and data cord 44 extend from a position outside outer wall 26 through portals 36 within gap 28 through insulation 31 and through portals 34 inside enclosure 20 and terminate within enclosure 20. Within gap 28 cords 40 and 44 are woven within insulation 31 such that if storage enclosure 20 is exposed to a fire and cords 40, 44 burn, they will not burn into the inside of enclosure 20. In a preferred embodiment, cords 40, 44 are standard electrical cords extending outside enclosure 20. In a preferred embodiment, cords 40, 44 may be stripped of plastic and covered with a non-flammable ceramic material, such as ceramic insulation compound No. 93795K62 available from McMaster-Carr supply company, between walls 24, 26. Said non-flammable ceramic material may insulate cords 40, 44. In another preferred embodiment, cords 40, 44 may be baffled in or woven in serpentine fashion through the gap 28 in the walls 24, 26 to prevent hazardous environmental elements, such as heat and fire, from travelling through the cords to the interior of the enclosure 20. Cords 40, 44 baffled in the walls 24, 26 may or may not be covered with a non-flammable ceramic material. FIG. 2 illustrates a preferred embodiment of baffling cords 40, 44 in the walls 24, 26.

In another embodiment, power cord 40 and data cord 44 may terminate for electronic access in at least one adapter port within the walls 24, 26 of enclosure 20. The adapter ports allow electronic communication between the interior and exterior of enclosure 20 through the gap 28 in the walls 24, 26. An external power cord or data cord may connect to power cord 40 and data cord 44 through the adapter ports in the wall 24, 26 of enclosure 20. In another embodiment, data cord 44 may be replaced by an infrared communications link, such as one well known in the art. Data may be transmitted via infrared transmission between an external data source 55 and the enclosure 20.

Each cord 40, 44 has a receiving end terminating within enclosure 20. At least one electronic data storage device 50 may be insertable into interior 21 of enclosure 20. Storage device 50 may be any type of data storage device, such as a Zip® floppy disc drive or a CD-ROM tower or the like. Device 50 may be connected to power cord 40 and data cord 44 within enclosure 20. Device 50 thus may be in continuous data communication with a data source 55. Door 23 to enclosure 20 may then be closed.

Using appropriate software and any other known method, data from a data source 55 may be continuously, periodically updated and stored on the storage device 50. If the surrounding area is damaged or destroyed by fire or other similar environmental hazard, the data may be saved on device 50 and protected within enclosure 20.

In an example, an Iomega® Zip Drive was placed in a Sentry 1710 Fire-Safe® Media Chest. Power and data cords were run through the wall of the Media Chest. The power cord was connected to a power outlet. The data cord was connected to a serial port on a Toshiba Satellite Pro laptop computer. A thermometer was placed in the Media Chest. Software backups were executed on the laptop computer. The backup data was transferred through the data cord for storage on the Iomega® Zip Drive. Backups were run ten times a day, and each backup executed in approximately five minutes. The temperature in the closed Media Chest never rose above approximately ninety degrees.

Some suitable enclosures 20 of the present invention are disclosed in the following U.S. Pat. Nos.:

| | |
|---|---|
| Des. 289,582 | 4,800,823 |
| 4,048,926 | 5,152,231 |
| 4,263,365 | 5,377,514 |
| 4,541,545 | 5,623,597 | each of which is expressly incorporated herein by reference. None of the above patents, however, discloses the elements herein disclosed and claimed, including use of power and data cords extending from the inside to the outside of the enclosure and specially configured.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A data protection device comprising:
   a fire-resistant enclosure comprising an inner wall and an outer wall and having a thermally resistant material between the inner and outer walls, the inner wall defining an interior volume for housing an electronic data storage device therein, and having a closeable opening, said enclosure capable of protecting contents from environmental hazard;
   at least one electrical connector within said enclosure for providing power inside said enclosure; and
   at least one data link within said enclosure for providing data communication between inside said enclosure and outside said enclosure when said opening is open or closed;
   said at least one electrical connector and said at least one data link extending outside said enclosure for connection with at least one power source and at least one data source;
   wherein said at least one electrical connector and said at least one data link extend between said inner and outer walls in such manner to substantially prevent an environmental hazard from affecting contents of said enclosure.

2. The data protection device of claim 1, further comprising said opening being selectively openable and closeable by a user, and said opening being of sufficient size to allow insertion of at least one data storage device into said enclosure.

3. The data protection device of claim 1, wherein said contents of said enclosure may be continuously connected to said at least one power source and said at least one data source.

4. The data protection device of claim 1, wherein said environmental hazard includes fire.

5. The data protection device of claim 1, wherein said at least one electrical connector provides power inside said enclosure to said contents.

6. The data protection device of claim 5, wherein said contents comprise at least one data storage device.

7. The data protection device of claim 1, wherein said at least one data link provides a data connection between said contents and said at least one data source.

8. The data protection device of claim 6, wherein said contents comprise at least one data storage device.

9. The data protection device of claim 1, wherein said contents comprise at least one data storage device.

10. The data protection device of claim 1, wherein said at least one data link comprises at least one infrared data transmitter.

11. A method of protecting an electronic data storage device from environmental hazard, comprising:
    enclosing said electronic data storage device in a fire-resistant housing capable of protecting said data storage device from environmental hazard, comprising an inner wall and an outer wall and having a thermally resistant material between the inner and outer walls, the inner wall defining an interior volume for enclosing the electronic data storage device therein, and an electrical conductor extending between said inner and outer walls to provide a power source within said housing and an electronic data link extending between said inner and outer walls to provide a data communication link within said housing for receiving electronic data within said housing, in such manner to resist damage to the electronic data within the housing from an environmental hazard;
    connecting said data storage device inside said housing to a power source outside said housing via said electrical conductor; and
    connecting said data storage device inside said housing to a data source outside said housing via said electronic data link.

12. The method of claim 11, wherein said environmental hazard includes fire.

13. The method of claim 11, further comprising providing a continuous connection between said data storage device inside said housing and said power source and said data source.

14. The method of claim 11, wherein said connection between said data storage device and said data source comprises an infrared connection.

15. A method of protecting electronic data from environmental hazard, comprising:
    placing an electronic data storage device within a fire-protected housing, the housing comprising an inner wall and an outer wall and having a thermally resistant material between the inner and outer walls, the inner wall defining an interior volume for enclosing an electronic data storage device therein, and an electrical conductor extending between said inner and outer walls to provide a power source within said housing and an electronic data link extending between said inner and outer walls to provide a data communication link within said housing for receiving electronic data within said housing, in such manner to resist damage to the electronic data within the housing from an environmental hazard;
    completely enclosing said electronic data storage device in the housing to protect said electronic storage device from environmental hazard;
    connecting said electronic storage device to a power source outside said housing;
    connecting said electronic storage device to a data source outside said housing; and
    storing data on said electronic storage device on an on-going basis within the housing.

16. The method of protecting electronic data according to claim 15, wherein said environmental hazard includes fire.

17. The method of protecting electronic data according to claim 15, further comprising providing a continuous connection between said stored electronic data inside said housing and said power source and said data source.

18. The method of protecting electronic data according to claim 15, further comprising storing said electronic data on a data storage device.

19. The method of protecting electronic data according to claim 18, further comprising connecting said data storage device to said power source outside said housing.

20. The method of protecting electronic data according to claim 18, further comprising connecting said data storage device to said data source outside said housing.

21. The method of protecting electronic data according to claim 15, wherein said connecting said housing to a data source outside said housing comprises an infrared connection.

* * * * *

US007232197C1

(12) EX PARTE REEXAMINATION CERTIFICATE (8448th)
United States Patent
Davis

(10) Number: US 7,232,197 C1
(45) Certificate Issued: Aug. 2, 2011

(54) FIRE-SAFE ELECTRONIC DATA STORAGE PROTECTION DEVICE

(76) Inventor: William P. Davis, Roselle, IL (US)

Reexamination Request:
No. 90/009,558, Oct. 29, 2009

Reexamination Certificate for:
Patent No.: 7,232,197
Issued: Jun. 19, 2007
Appl. No.: 10/464,595
Filed: Jun. 18, 2003

Related U.S. Application Data

(63) Continuation of application No. 09/640,197, filed on Aug. 16, 2000, now abandoned.

(51) Int. Cl.
*A47B 96/00* (2006.01)

(52) U.S. Cl. ........................................ 312/409
(58) Field of Classification Search .................. None
See application file for complete search history.

(56) References Cited

U.S. PATENT DOCUMENTS

| | | | | |
|---|---|---|---|---|
| 4,378,574 A | * | 3/1983 | Stephenson | 360/71 |
| 4,944,401 A | | 7/1990 | Groenewegen | 206/521 |
| 5,295,447 A | * | 3/1994 | Robbins et al. | 109/65 |
| 5,932,839 A | * | 8/1999 | Ren et al. | 174/17 SF |
| 6,158,833 A | | 12/2000 | Engler | 312/409 |
| 6,898,492 B2 | | 5/2005 | De Leon et al. | 701/35 |

FOREIGN PATENT DOCUMENTS

JP 10-2739990 * 10/1998

OTHER PUBLICATIONS

'uninterruptible power supply (UPS)' 2001, in *Hargrave's Communications Dictionary*, Wiley, Hoboken, NJ, USA, viewed Dec. 3, 2010, <from http://www.credoreference.com/entry/hargravecomms/uninterruptible_power_supply_ups>.*
"on–going." *Merriam–Webster Online Dictionary.* 2010. Merriam–Webster Online. Jun. 18, 2010 <http://www.merriam–webster.com/dictionary/on–going>.*

* cited by examiner

*Primary Examiner* — Sara Clarke

(57) ABSTRACT

A fire-safe electronic data storage protection device is provided which allows all-time data storage backup and protection. A preferred embodiment of the device includes a fireproof enclosure having an openable and closeable door which can be opened after the device is exposed to a fire. The enclosure is of a sufficient size to store an electronic data storage device such as Zip® drive for CD-ROM storage device or the like. Further, the walls of the enclosure are insulated to withstand fire and carry electronic connection and data relay cords, so that the electronic storage device inside may be in continuous connection with a main database and a power supply. The electrical and communication cords are configured within the insulation and walls of the enclosure to ensure no fire reaches the inside of the enclosure.

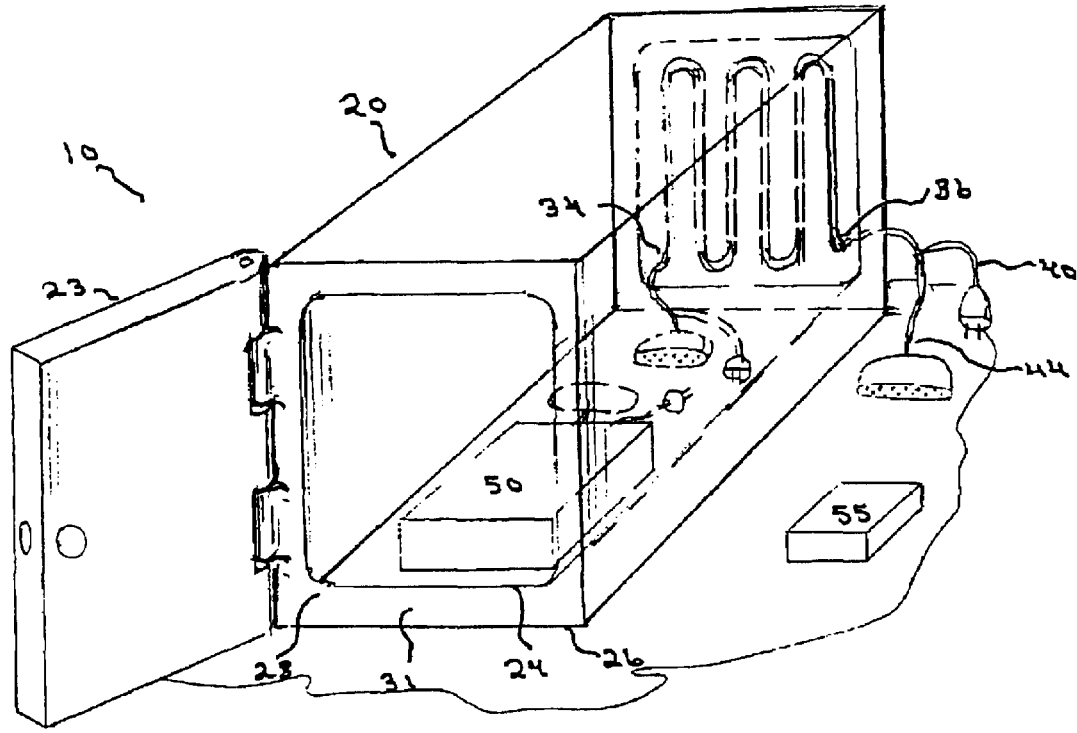

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10, 14 and 21 is confirmed.

Claims 1-9, 11-13 and 15-20 are cancelled.

* * * * *